United States Patent
Ramanujam

(10) Patent No.: US 10,220,705 B2
(45) Date of Patent: Mar. 5, 2019

(54) SHARING AUTONOMOUS VEHICLES

(71) Applicant: Madhusoodhan Ramanujam, Salt Lake City, UT (US)

(72) Inventor: Madhusoodhan Ramanujam, Salt Lake City, UT (US)

( * ) Notice: Subject to any disclaimer, the term of this patent is extended or adjusted under 35 U.S.C. 154(b) by 555 days.

(21) Appl. No.: 14/824,087

(22) Filed: Aug. 12, 2015

(65) Prior Publication Data

US 2015/0338852 A1 Nov. 26, 2015

(51) Int. Cl.
*G05D 1/00* (2006.01)
*B60K 35/00* (2006.01)
*G01C 21/26* (2006.01)
*G08G 1/00* (2006.01)
*G01C 21/34* (2006.01)

(52) U.S. Cl.
CPC .............. *B60K 35/00* (2013.01); *G01C 21/26* (2013.01); *G08G 1/202* (2013.01); *B60K 2350/1096* (2013.01); *B60K 2350/962* (2013.01); *B60K 2350/967* (2013.01); *G01C 21/343* (2013.01)

(58) Field of Classification Search
None
See application file for complete search history.

(56) References Cited

U.S. PATENT DOCUMENTS

| 7,502,747 | B1* | 3/2009 | Pardo | G06Q 10/06 705/7.13 |
| 8,078,349 | B1 | 12/2011 | Prada Gomez | |
| 2008/0027599 | A1* | 1/2008 | Logan | G05D 1/0234 701/23 |
| 2012/0041675 | A1* | 2/2012 | Juliver | G06Q 10/08 701/465 |
| 2012/0072051 | A1* | 3/2012 | Koon | G05D 1/0278 701/2 |
| 2012/0083959 | A1 | 4/2012 | Dolgov | |
| 2012/0083960 | A1 | 4/2012 | Zhu | |
| 2014/0016826 | A1 | 1/2014 | Fairfield | |
| 2014/0365250 | A1* | 12/2014 | Ikeda | G06Q 50/30 705/5 |
| 2015/0324708 | A1* | 11/2015 | Skipp | G06Q 10/025 705/5 |
| 2016/0189112 | A1* | 6/2016 | Kidron | G06Q 10/109 705/7.19 |
| 2016/0247109 | A1* | 8/2016 | Scicluna | G06Q 10/06315 |

* cited by examiner

*Primary Examiner* — Todd M Melton
*Assistant Examiner* — Jason R Roberson
(74) *Attorney, Agent, or Firm* — Madhusoodhan Ramanujarr

(57) ABSTRACT

Technology is described for sharing an autonomous vehicle. An autonomous vehicle may receive a request to perform a task. The autonomous vehicle may determine whether the task conflicts with previously scheduled tasks to be performed at the autonomous vehicle. The autonomous vehicle may add the task to a schedule of tasks to be performed at the autonomous vehicle when the task does not conflict with the previously scheduled tasks. The autonomous vehicle may provide commands to enable the autonomous vehicle to perform the task in accordance with the schedule.

20 Claims, 10 Drawing Sheets

SHARING AUTONOMOUS VEHICLES

BACKGROUND

Autonomous vehicles, such as self-driving cars, may operate with minimal or substantially no human input. For example, a passenger may enter a destination at a console of the autonomous vehicle, such as a touch screen, and the autonomous vehicle may navigate itself to the destination (e.g., a movie theater) by sensing its surrounding environment. The autonomous vehicle may sense its surroundings using a combination of sensors, cameras, radar, light detection and ranging (LIDAR), global positioning system (GPS), etc.

Autonomous vehicles offer a large number of benefits as compared to traditional automobiles. For example, autonomous vehicles may reduce traffic collisions due to the autonomous vehicle's increased reliability and improved reaction time as compared to human drivers. Autonomous vehicles may increase roadway capacity and reduce traffic congestion. In addition, passengers that are under age, elderly, disabled, intoxicated, or otherwise impaired may benefit from traveling in autonomous vehicles.

DETAILED DESCRIPTION

Figure 1:
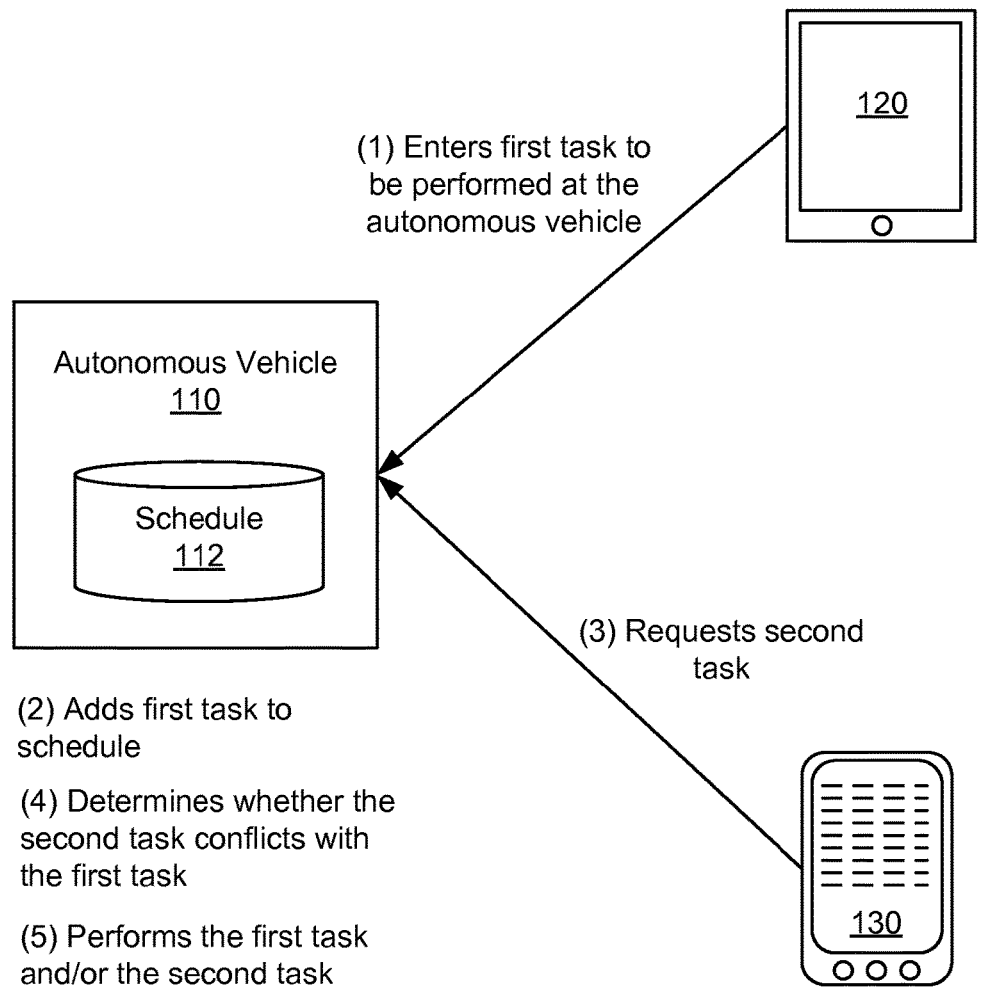
FIG. 1 illustrates a system and related operations for sharing an autonomous vehicle according to an example of the present technology.

Technology is described for sharing an autonomous vehicle among a selected group of individuals or users. One example of an autonomous vehicle is a self-driving car or a driverless car. The selected group of individuals may include family members, friends, colleagues, neighbors, etc. At least one individual in the selected group of individuals may be an owner of the autonomous vehicle. The autonomous vehicle may perform a number of tasks for the selected group of individuals on a given day. The tasks may include driving one or more individuals in the selected group of individuals from a starting location to an ending location. In other words, the autonomous vehicle may drive the individuals from a pickup location to a drop-off location in accordance with a defined task.

In one example, the autonomous vehicle may perform the tasks according to a schedule. The schedule may be created and modified by one or more individuals that are authorized to create and modify the schedule, and then the schedule may be maintained and implemented by the autonomous vehicle. As an example, the individual authorized to create and modify the schedule of the autonomous vehicle may include the owner of the autonomous vehicle or an individual granted permission from the owner to create and/or modify the schedule. The individual may schedule the task using a user interface in the autonomous vehicle, or alternatively, using an application on a computing device (e.g., a tablet computer) that communicates the schedule to the autonomous vehicle. As a non-limiting example, the autonomous vehicle may drive children from home to school at 8 AM, drive parents from home to work at 9 AM, drive the children from school to home at 3 PM and drive the parents from work to home at 6 PM in accordance with the schedule. In this example, the autonomous vehicle may be shared by members of a family to perform everyday tasks.

In one example, the individual may define a pickup location, pickup time, drop-off location and/or drop-off time for the task. As an example, if the individual wishes to be picked up at a pickup location at a pickup time, then the individual may define a task that includes only the pickup location and the pickup time, and prior to the task being performed, the autonomous vehicle may calculate when to begin driving from a current location of the autonomous vehicle in order to arrive at the pickup location at the pickup time.

In one example, the pickup location may be a current location of the autonomous vehicle. For example, the autonomous vehicle may be parked in the individual's home and the individual may enter the autonomous vehicle to go to work in the morning. In this case, the individual may enter the autonomous vehicle and provide instructions for the autonomous vehicle to drive to the drop-off location. A task of driving from home to the drop-off location may be included in the autonomous vehicle's schedule.

In one example, the task added to the schedule may be a recurring task or a one-time task. Recurring tasks may be performed by the autonomous vehicle task according to a predetermined frequency, such as once a day, once a week, three times a week, etc. A non-limiting example of a recurring task may be picking the children up from school at 3 PM on school days and driving the children to violin practice. On the other hand, one-time tasks may be a single event (i.e., a task that is not repeated again). A non-limiting example of a one-time task may be driving an individual to a movie theater at 2 PM, and then driving the individual back home from the movie theater.

In one example, the individual may attempt to enter a new task into the schedule, wherein the task coincides with a previously scheduled task. In this case, the autonomous vehicle may decline the new task requested from the individual. However, the autonomous vehicle may suggest an alternate time for the new task that does not coincide with the previously scheduled task. In one example, tasks that are scheduled earlier in time may have a higher priority than tasks that are scheduled later in time.

In one configuration, the autonomous vehicle may perform tasks in accordance with the schedule. In one example, the autonomous vehicle may only perform each task on the schedule after receiving a confirmation from the individual. The autonomous vehicle may send a notification to the individual's mobile device when the autonomous vehicle is in proximity to the pickup location. For example, the autonomous vehicle may send the notification approximately ten minutes before the autonomous vehicle is scheduled to arrive at the pickup location and/or a notification when the autonomous vehicle has arrived at the pickup location. In one example, the autonomous vehicle may identify traffic information for a route currently being used to drive to the pickup location. The autonomous vehicle may select an alternative route to the pickup location in order to avoid traffic congestion and/or a late arrival at the pickup location. If traffic is expected to delay the autonomous vehicle, the autonomous vehicle may notify the individual of an estimated arrival time based on the traffic information.

When the autonomous vehicle arrives at the pickup location, the individual may be granted access to the autonomous vehicle upon providing a form of authentication. For example, the individual may be carrying a keychain that, if placed in proximity to the autonomous vehicle, verifies that the individual is authorized to enter into the autonomous vehicle. As another example, the autonomous vehicle may detect that the individual's mobile device is in proximity to the autonomous vehicle, and therefore, the individual is presumed to be carrying the mobile device and is authorized to enter into the autonomous vehicle. After the individual enters inside the autonomous vehicle, the autonomous vehicle may continue performing the task (e.g., driving to a drop-off location) in accordance with the defined task.

In one example, the autonomous vehicle may automatically perform the tasks on the schedule unless a specific task is cancelled or modified. In particular, the individual may modify the autonomous vehicle's schedule to indicate that the task is to be cancelled or modified. As an example, the autonomous vehicle may be scheduled to pick up the individual at work at 6 PM in accordance with the task. If the individual is sick that day and does not go to work, then the task may be cancelled. In another example, after receiving a request to modify an existing task, the autonomous vehicle may check the schedule to verify that the modification does not conflict with a previously scheduled task. If no conflict occurs, then the autonomous vehicle may perform a modified version of the existing task. IAs a non-limiting example, the individual may request the autonomous vehicle to modify a pickup time from 6 PM to 6:30 PM. If the modification does not conflict with other scheduled tasks, then the autonomous vehicle may pick up the individual at 6:30 PM. In one example, if the task is a recurring task, than the recurring task may be cancelled or modified for a particular day.

In one configuration, the individual may request for a one-time task to be performed at a current time by the autonomous vehicle. For example, the individual's mobile device may send a request to the autonomous vehicle to perform the one-time task. The autonomous vehicle may verify that no previously scheduled recurring tasks or one-time tasks conflict with the individual's request. In general, tasks that are scheduled earlier in time may have a higher priority as compared to tasks that are scheduled later in time. The autonomous vehicle may perform the one-time task for the individual if there is no conflict with other tasks on the schedule.

As a non-limiting example, the individual may request the autonomous vehicle to pick up the individual at work at a current time (e.g., 2 PM) in order to run errands until 3 PM. If there is no conflicting task during that time, the autonomous vehicle may perform the requested task. Alternatively, if the autonomous vehicle determines that a conflicting task is to be performed at 3 PM (e.g., picking up the children from school), the autonomous vehicle may suggest that the one-time task be modified to end at 2:45 PM, or alternatively, run from 1:45 PM to 2:45 PM in order to accommodate the conflicting task. The individual may determine whether to accept the suggestion, or request a new one-time task at a modified time.

In one configuration, an individual may attempt to schedule a new task (e.g., a recurring task or one-time task) that conflicts with a previously scheduled task. A message may be sent to an individual associated with the previously scheduled task. The message may request the individual to modify the previously scheduled task in order to accommodate the new task. If the individual agrees to modify the previously scheduled task, then the previously scheduled task may be rescheduled to not conflict with the new task. As a non-limiting example, the autonomous vehicle may be scheduled to pick up a father from work at 6 PM. However, a son may be unexpectedly called in for a job interview that is to last until 6:30 PM. The father may receive a request to modify the pickup time to 6:45, and the father may determine whether or not to accept the request. In other words, even though the recurring task of picking up the father at work was previously scheduled, the father may agree to modify the recurring task.

In one configuration, the autonomous vehicle may return to a base location between tasks. The autonomous vehicle may return to the base location until a subsequent task is to be performed. For example, if the autonomous vehicle performs a task at 9 PM and the next task is not scheduled until 3 PM, the autonomous vehicle may return to an individual's home after performing the task at 9 AM. Alternatively, the autonomous vehicle may park itself at a selected location, as instructed by the owner of the autonomous vehicle. The autonomous vehicle may exit the selected location in order to perform a subsequent task.

FIG. 1 illustrates an exemplary system and related operations for sharing an autonomous vehicle 110 among a selected group of individuals. The autonomous vehicle 110 may be configured to perform a number of tasks in accordance with a schedule 112. The tasks may include driving to a preselected location in order to pick up an individual, driving to a preselected location in order to drop off an individual, driving to a preselected location to enable a service (e.g., vehicle maintenance, vehicle refueling or recharging) to be performed on the autonomous vehicle 320, etc. In one example, a first device 120 may insert a first task into the schedule 112 of tasks to be performed by the autonomous vehicle 110. The first device 120 may be authorized to create and/or modify the schedule 112. For example, the first device 120 may have been previously paired or registered with the autonomous vehicle 110, such that the autonomous vehicle 110 is subsequently configured to accept schedule requests from the first device 120.

In one example, the first task may be added to the schedule 112 when the first task does not conflict with previously scheduled tasks to be performed at the autonomous vehicle 110. At a later time, an individual may request, via a second device 130, a second task to be performed by the autonomous vehicle 110. The first task and the second task may be one-time tasks that involve the autonomous vehicle 110 performing a singular event (i.e., a task that is not repeated again). Non-limiting examples of the one-time task may include driving the individual to a movie theater, picking up the individual from swim class, etc. Alternatively, the first task and the second task may be recurring tasks, which are performed according to the defined periodicity (e.g., weekly at a defined time).

The autonomous vehicle 110 may determine whether the second task that was requested later in time conflicts with the first task that was scheduled earlier in time. In one example, the autonomous vehicle 110 may determine that the second task does not conflict with the first task on the schedule 112. In this example, the autonomous vehicle 110 may add the second task to the schedule 112. In an alternative example, the autonomous vehicle 110 may determine that the second task conflicts with the first task on the schedule 112. In this example, the autonomous vehicle 110 may send a message to the second device 130 with a suggested modified time for the second task that does not conflict with the first task. If the second device 130 sends a message acknowledging the modified time, then the autonomous vehicle 110 may add the second task to the schedule 112 at the modified time. Therefore, the individuals associated with the first device 120 and the second device 130 may both share the autonomous vehicle 110.

Figure 2:
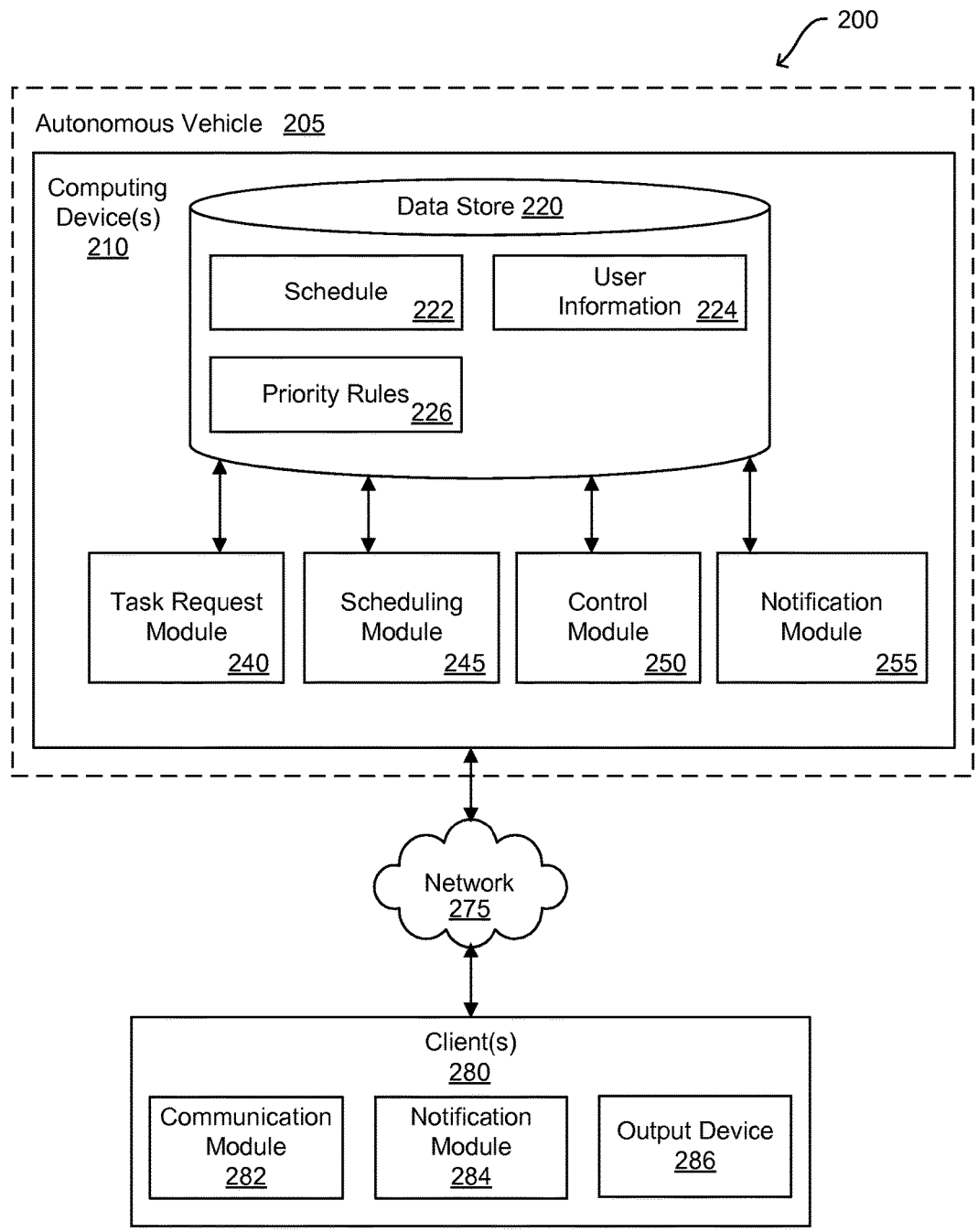
FIG. 2 is an illustration of a networked system for sharing an autonomous vehicle according to an example of the present technology.

In the following discussion, a general description of an example system for sharing an autonomous vehicle 205 and the system's components are provided. The general description is followed by a discussion of the operation of the components in a system for the technology. FIG. 2 illustrates a networked environment 200 according to one example of the present technology. The networked environment 200 may include one or more computing devices 210 in data communication with a client 280 by way of a network 275. In one example, the computing device 210 may be included in an autonomous vehicle 205, and the client 280 may include a mobile device of a user associated with the autonomous vehicle 205. The network 275 may include the Internet, intranets, extranets, wide area networks (WANs), local area networks (LANs), wired networks, wireless networks, or other suitable networks, etc., or any combination of two or more such networks.

Various applications, services and/or other functionality may be executed in the computing device 210 according to varying embodiments. Also, various data may be stored in a data store 220 that is accessible to the computing device 210. The term "data store" may refer to any device or combination of devices capable of storing, accessing, organizing, and/or retrieving data, which may include any combination and number of data servers, relational databases, object oriented databases, simple web storage systems, cloud storage systems, data storage devices, data warehouses, flat files, and data storage configuration in any centralized, distributed, or clustered environment. The storage system components of the data store may include storage systems such as a SAN (Storage Area Network), cloud storage network, volatile or non-volatile RAM, optical media, or hard-drive type media. The data stored in the data store 220, for example, may be associated with the operation of the various applications and/or functional entities described below.

The data stored in the data store 220 may include a schedule 222. The schedule 222 may indicate a plurality of tasks that are to be performed by an autonomous vehicle 205. The tasks may involve the autonomous vehicle 205 performing a pick-up (e.g., picking up a passenger at a selected location and at a selected time), as well as the autonomous vehicle 205 performing a drop off (e.g., dropping off the passenger at a selected location and at a selected time). In other words, the autonomous vehicle 205 may perform the tasks in accordance with the schedule 222. In one example, the schedule 222 may include a list of recurring tasks that are to be performed by the autonomous vehicle 205, as well as a list of one-time tasks that are to be performed by the autonomous vehicle 205. The recurring tasks included on the schedule 222 may be performed at a predefined time and according to a predefined frequency. A non-limiting example of a recurring task may include the autonomous vehicle 205 picking up the passenger from school every day at 3 PM. The one-time task included on the schedule 222 may be performed a single time. A non-limiting example of the one-time task may include the autonomous vehicle 205 driving a passenger to a coffee shop at 2 PM. The schedule 222 may be dynamically updated as requests for tasks are received from the passenger via the client 280. In addition, the schedule 222 may be dynamically updated as scheduled tasks are modified or cancelled via the client 280.

The data stored in the data store 220 may include user information 224. The user information 224 may identify a selected group of users or individuals that are authorized to share the autonomous vehicle 205. In other words, the user information 224 may identify the selected group of users that are authorized to create or modify the schedule 222 of the autonomous vehicle 205. In one example, the user information 224 may include an identifier, such as a device identifier or an Internet Protocol (IP) address, for each client 280 that is used by the group of authorized users. Therefore, devices that attempt to schedule tasks with the autonomous vehicle 205 that are not defined in the user information 224 may be barred from accessing the autonomous vehicle's schedule 222.

The data stored in the data store 220 may include priority rules 226. The priority rules 226 may define which tasks are assigned a higher priority as compared to other tasks when there is a conflict between the tasks. In one example, the priority rules 226 may indicate that tasks that are scheduled earlier in time have priority over tasks that are scheduled later in time. In one example, the priority rules 226 may indicate that certain types of tasks may have a higher priority than other types of tasks. For example, tasks related to academics (e.g., dropping kids at school, driving kids to music lessons) may have a higher priority than tasks related to social events (e.g., driving to an ice cream parlor). In one example, the priority rules 226 may indicate that recurring tasks have a higher priority than one-time tasks. For example, a user that attempts to schedule a one-time task may be denied when the one-time task conflicts with a recurring task on the schedule 222. In one example, the priority rules 226 may indicate that tasks for a particular individual may have a higher priority than tasks for other individuals. For example, tasks for a first user may be prioritized over tasks for a second user, even when the first user schedules tasks later in time as compared to the second user.

The components executed on the computing device 210 may include a task request module 240, a scheduling module 245, a control module 250, a notification module 255, and other applications, services, processes, systems, engines, or functionality not discussed in detail herein. The task request module 240 may be configured to receive a request for a task to be performed at the autonomous vehicle 205. The task request module 240 may receive the request, via the client 280, from an individual that has been previously authorized to request tasks from the autonomous vehicle 205. Non-limiting examples of the tasks may include dropping off a passenger at a selected location or picking up the passenger at the selected location. The request may include various details about the task, such as a selected time at which the task is to be performed (e.g., a pickup time and/or a drop-off time), a pickup location, a drop-off location, etc. In one example, the task request module 240 may receive a request to perform a recurring task, or alternatively, the task request module 240 may receive a request to perform a one-time task.

The scheduling module 245 may be configured to add the tasks to a schedule 222 of tasks to be performed at the autonomous vehicle 205 when the tasks do not conflict with previously scheduled tasks on the schedule 222. For example, the scheduling module 245 may determine whether a requested task conflicts with a previously scheduled task on the schedule 222. The scheduling module 245 may add the requested task to the schedule 222 when the requested task does not conflict with previously scheduled tasks that are included on the schedule 222, or alternatively, the scheduling module 245 may not add the requested task to the schedule 222 when the requested task does conflict with at least one previously scheduled task on the schedule 222. The scheduling module 245 may estimate an amount of time to perform the task based on details about the task (as well as traffic information and a distance to be traveled when performing the task), and then use the estimated amount of time to determine whether the task is expected to conflict with previously scheduled tasks. In one example, the scheduling module 245 may identify an alternative time for the autonomous vehicle 205 to perform the requested task that does not conflict with the previously scheduled tasks on the schedule 222. The alternative time may be within a defined time frame (e.g., within 30 minutes of a requested time to perform the task), or the alternative time may be immediately after the previously scheduled task is performed by the autonomous vehicle 205.

The control module 250 may be configured to provide commands to enable the autonomous vehicle 205 to perform the tasks in accordance with the schedule. In particular, the control module 250 may provide commands to the autonomous vehicle's actuators, thereby controlling steering, acceleration, braking and throttle of the autonomous vehicle 205. The control module 250 may provide commands to drive the autonomous vehicle 205 to a defined location at a selected time to pick up a user in accordance with the task. The control module 250 may provide commands to drive the autonomous vehicle 205 to the defined location to drop off the user at the selected time in accordance with the task. In another example, the control module 250 may provide commands to drive the autonomous vehicle 205 to a base location or park in an available space between tasks on the schedule 222.

The notification module 255 may be configured to provide a notification to the client 280 when the autonomous vehicle 205 is in proximity to a selected location associated with the task. As a non-limiting example, the notification module 255 may send the notification when the autonomous vehicle 205 is approximately two minutes away from the selected location. In another example, the notification module 255 may send an additional notification with an updated estimated arrival time when the autonomous vehicle 205 is delayed in route to the current location. The updated estimated arrival time may be calculated based on traffic information for the route being used by the autonomous vehicle 205 to perform the task.

Certain processing modules may be discussed in connection with this technology and FIG. 2. In one example configuration, a module of FIG. 2 may be considered a service with one or more processes executing on a server or other computer hardware. Such services may be centrally hosted functionality or a service application that may receive requests and provide output to other services or customer devices. For example, modules providing services may be considered on-demand computing that are hosted in a server, cloud, grid, or cluster computing system. An application program interface (API) may be provided for each module to enable a second module to send requests to and receive output from the first module. Such APIs may also allow third parties to interface with the module and make requests and receive output from the modules. Third parties may either access the modules using authentication credentials that provide on-going access to the module or the third party access may be based on a per transaction access where the third party pays for specific transactions that are provided and consumed.

The computing device 210 may comprise, for example, a server computer or any other system providing computing capability. For purposes of convenience, the computing device 210 is referred to herein in the singular. Even though the computing device 210 is referred to in the singular, it is understood that a plurality of computing devices 210 may be employed. As previously described, the computing device 210 may be operating within an autonomous vehicle 205.

The client 280 may be representative of a plurality of client devices that may be coupled to the network 275. The client 280 may comprise, for example, a processor-based system such as a computer system. Such a computer system may be embodied in the form of a laptop computer, personal digital assistants, cellular telephones, smartphones, tablet computer systems, or other devices with like capability. In one example, the client 280 may be associated with a user in a selected group of users that are authorized to share the autonomous vehicle 205.

The client 280 may include a communication module 282 configured to communicate with the computing device 210. For example, the communication module 282 may send, via an application that is executing on the client 280, a request for the autonomous vehicle 205 to perform a particular task. The task may include picking up a user associated with the client 280 at a selected pickup location and/or dropping the user off at a selected drop-off location. In another configuration, the communication module 282 may receive a confirmation message indicating that the autonomous vehicle 205 is available to perform the requested task.

The client 280 may include a notification module 284 configured to receive a notification when the autonomous vehicle 205 is in proximity to a selected location associated with the task. In another example, the notification module 284 may receive an additional notification with an updated estimated arrival time when the autonomous vehicle 205 is delayed in route to the selected location. As a non-limiting example, the notification module 284 may indicate that the autonomous vehicle 205 is to arrive at the selected location approximately 15 minutes past schedule.

The client 280 may include or be coupled to an output device 286. The output device 286 may comprise, for example, one or more devices such as cathode ray tubes (CRTs), liquid crystal display (LCD) screens, gas plasma-based flat panel displays, LCD projectors, or other types of display devices, etc.

Figure 3A:
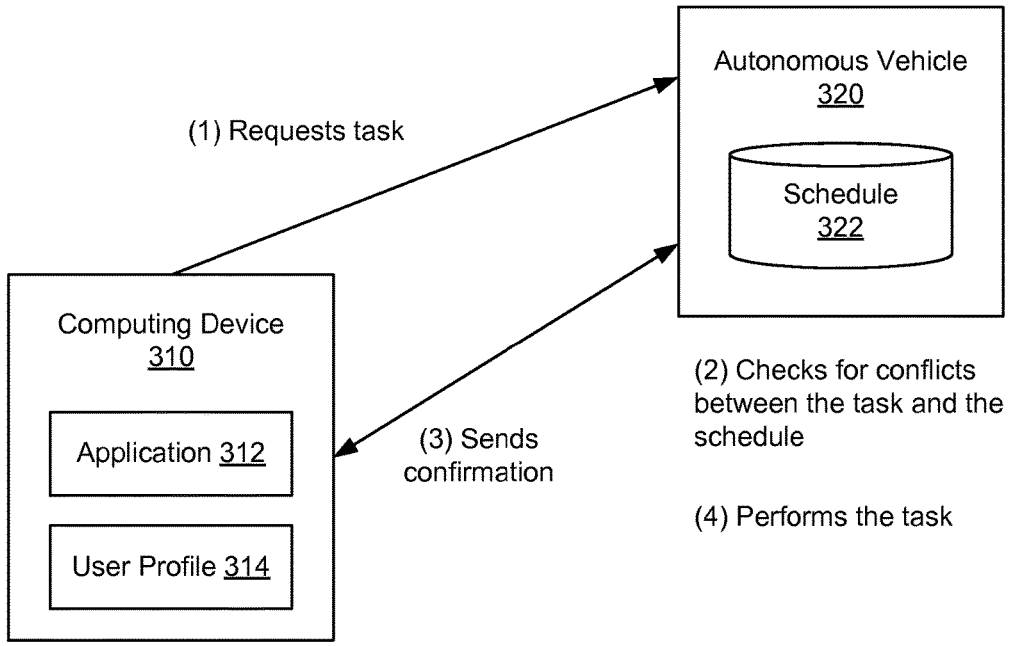
FIG. 3A illustrates a system and related operations for performing a task at an autonomous vehicle after receiving a task request from a mobile device according to an example of the present technology.

FIG. 3A illustrates an exemplary system and related operations for performing a task at an autonomous vehicle 320 after receiving a task request from a computing device 310. The autonomous vehicle 320 may be configured to perform a plurality of tasks in accordance with a schedule 322. The schedule 322 may be stored and/or accessed by the autonomous vehicle 320, and the autonomous vehicle 320 may perform the tasks in accordance with the schedule 322. Non-limiting examples of the tasks performed by the autonomous vehicle 320 may include driving to a preselected location in order to pick up an individual, driving to a preselected location in order to drop off an individual, driving to a preselected location to enable a service (e.g., vehicle maintenance, vehicle refueling or recharging) to be performed on the autonomous vehicle 320, driving to a preselected location to enable an individual to perform a task, etc. The task may be a recurring task (i.e., a task that recurs in accordance with a defined periodicity), or alternatively, the task may be a one-time task (i.e., a task that is performed a single time).

In one example, the autonomous vehicle 320 may perform the tasks on the schedule 322 for a selected group of individuals that are authorized to use the autonomous vehicle 320. The selected group of individuals may include family members, friends, colleagues, neighbors, etc. A designated individual (e.g., the owner of the autonomous vehicle 320) may determine which individuals are allowed to use the autonomous vehicle 320, as well as which individuals are not allowed to use the autonomous vehicle 320. An individual that is allowed access to the autonomous vehicle 320 may communicate with the autonomous vehicle 320, via an application 312 that executes on the computing device 310, in order to request the autonomous vehicle 320 to perform tasks for the individual (e.g., pickups or drop offs).

In one configuration, the individuals that are allowed to use the autonomous vehicle 320 may communicate with the autonomous vehicle 320 via the application 312 that executes on the computing device 310. Each individual that is authorized to use the autonomous vehicle 320 may run a copy of the application 312 on a separate computing device. The computing device 310 may download and install the application 312. The computing device 310 may be paired or registered with the autonomous vehicle 320 using the application 312. A registration procedure may inherently ensure that the individual (e.g., a family member) has been preauthorized by the designated individual (e.g., the owner of the autonomous vehicle 320) to register the computing device 310 with the autonomous vehicle 320. After completion of the procedure, the application 312 on the computing device 310 may allow the individual to communicate with the autonomous vehicle 320 from the computing device 310 to request tasks to be performed by the autonomous vehicle 320 (e.g., pickups or drop offs). In one example, the computing device 310 may be a mobile device, and the individual may be proximately located to the autonomous vehicle 320 when initiating the pairing procedure. This proximity may ensure that the individual is authorized to access the autonomous vehicle 320 and pair the computing device 310 with the autonomous vehicle 320.

In one example, the computing device 310 may send, via the application 312 executing on the computing device 310, a request for a task to be performed by the autonomous vehicle 320. The task defined in the request may be a recurring task or a one-time task. The request for the task may indicate a pickup location (or a starting location), a pickup time, a drop-off location (or an ending location) and/or a drop-off time. The pickup location and/or the drop-off location may be associated with a particular address, geographical coordinates (e.g., longitude and latitude), etc. In one example, the pickup time and/or the drop-off time may be an acceptable time range (e.g., Dad may be picked up from work between 5:30 PM and 6 PM). As previously explained, the computing device 310 may be previously paired with the autonomous vehicle 320, such that the computing device 310 is authorized to request tasks from the autonomous vehicle 320.

The autonomous vehicle 320 may compare the task with the schedule 322 of tasks that the autonomous vehicle 320 is to perform. In other words, the autonomous vehicle 320 may determine whether the task conflicts with previously scheduled tasks that are already included on the schedule 322. Based on the request received from the computing device 310, the pickup location, the drop-off location, real-time traffic data, the autonomous vehicle 320 may determine an estimated amount of time for performing the task. The autonomous vehicle 320 may use the estimated amount of time when determining whether the task conflicts with the previously scheduled tasks on the schedule 322. In general, tasks that are scheduled earlier in time may have a higher priority as compared to tasks that are requested later in time.

In one example, the autonomous vehicle 320 may determine that the task does not conflict with previously scheduled tasks on the schedule 322. Therefore, the autonomous vehicle 320 may add the task to the schedule 322. The autonomous vehicle 320 may send a confirmation message to the computing device 310, which confirms that the autonomous vehicle 320 is scheduled to perform the requested task.

In order to perform the task in accordance with the schedule 322, the autonomous vehicle 320 may drive from the autonomous vehicle's current location to the pickup location, such that the autonomous vehicle 320 may arrive at the pickup location at the selected pickup time. The autonomous vehicle 320 may use real-time traffic information when determining a route for traveling from the autonomous vehicle's current location to the pickup location. Based on the traffic information, the autonomous vehicle 320 may leave the current location to start driving to the pickup location accordingly. One or more processors of the autonomous vehicle 320 may provide commands to drive the autonomous vehicle 320 from the autonomous vehicle's current location (e.g., the individual's home) to the pickup location. The commands may be provided to the autonomous vehicle's actuators, thereby controlling steering, acceleration, braking and throttle of the autonomous vehicle 320. In addition, the one or more processors of the autonomous vehicle 320 may provide commands to drive the autonomous vehicle 320 from the pickup location to the drop-off location. The autonomous vehicle 320 may use the real-time traffic information to select a route for driving from the pickup location to the drop-off location, and then the autonomous vehicle 320 may drive to the pickup location in accordance with the route.

In one configuration, the computing device 310 (e.g., a mobile device) may send a request for a task to be performed by the autonomous vehicle 320, wherein the request defines the task to be performed at a current time. The request may include a current location of the computing device 310, wherein the current location is also the pickup location. The autonomous vehicle 320 may check the schedule 322 to verify that the task does not conflict with previously scheduled tasks to be performed at the autonomous vehicle 320. If there is no conflict, the autonomous vehicle 320 may send a message to the computing device 310 indicating that the autonomous vehicle 320 is available to perform the task at the current time. The message may include an estimated arrival time for the autonomous vehicle 320 to arrive at the computing device's current location. The autonomous vehicle 320 may select a route for driving from the autonomous vehicle's current location to the computing device's current location (or pickup location). In addition, the autonomous vehicle 320 may select a route for driving from the pickup location to the drop-off location.

In one example, the autonomous vehicle 320 may send a notification to the computing device 310 when the autonomous vehicle 320 is approaching the pickup location (e.g., when the autonomous vehicle 320 is five minutes away from the pickup location), as well as an additional notification when the autonomous vehicle 320 has arrived at the pickup location. In one example, the autonomous vehicle 320 may determine that a pickup time may be delayed, for example, due to traffic. The autonomous vehicle 320 may calculate an adjusted pickup time based on traffic information for the route being used by the autonomous vehicle 320 to perform the task. The autonomous vehicle 320 may notify the computing device 310 of the adjusted pickup time.

When the autonomous vehicle 320 arrives at the pickup location, the individual may be granted access to the autonomous vehicle 320 after providing a form of authentication. For example, the individual may be carrying a keychain that, if placed in proximity to the autonomous vehicle 320, verifies that the individual is authorized to enter into the autonomous vehicle 320. In another example, the individual may press a button or enter an access code on the keychain and/or the autonomous vehicle 320 to gain access to the autonomous vehicle 320. As yet another example, the autonomous vehicle 320 may detect that the individual's computing device 310 is in proximity to the autonomous vehicle 320, and therefore, the individual is presumed to be carrying the computing device 310 and is authorized to enter into the autonomous vehicle 320.

The autonomous vehicle 320 may perform the task after arriving at the pickup location and the individual enters into the autonomous vehicle 320. The autonomous vehicle 320 may perform the task by driving from the pickup location to the drop-off location. In one example, the autonomous vehicle 320 may permit the individual to control or steer the autonomous vehicle 320 when driving to the drop-off location. After completing the task, the autonomous vehicle 320 may drive to perform another task in accordance with the schedule 322, or alternatively, the autonomous vehicle 320 may drive to a selected location (e.g., a parking garage or the individual's home), park the autonomous vehicle 320 at the selected location, and wait until a subsequent task on the schedule 322 is due to be performed.

In one configuration, the autonomous vehicle 320 may adjust one or more settings and/or features of the autonomous vehicle 320 before arriving at the pickup location. For example, the autonomous vehicle 320 may adjust the settings and/or features when driving to the pickup location. The autonomous vehicle 320 may adjust the settings and/or features based on a user profile 314 associated with the computing device 310. For example, the user profile 314 may indicate that the individual likes a certain type of music, a certain temperature setting, a certain seat position, a certain type of lighting, etc. Therefore, the autonomous vehicle 320 may adjust a music system, a heating and cooling system, a lighting system, etc. of the autonomous vehicle 320 to correspond with the user profile 314 before arriving at the pickup location.

As a non-limiting example, a teenager may be authorized to use the autonomous vehicle 320 that is shared by the teenager's family. The teenager may wish to be dropped off at the library at 4 PM to study for a test. The teenager may initially be at home. The teenager, via the application 312 that executes on the computing device 310, may request a task from the autonomous vehicle 320. The task may specify the pickup location (e.g., home), the drop-off location (e.g., the library), and the pickup time (e.g., 4 PM). In one example, the pickup time may be a current time. The autonomous vehicle 320 may receive the request from the computing device 310. The autonomous vehicle 320 may be currently parked at a workplace associated with the teenager's father. The autonomous vehicle 320 may verify that the request does not conflict with previously scheduled tasks on the schedule 322. The schedule 322 may indicate that the autonomous vehicle's next task is to drive the father home from the workplace at 6 PM. The autonomous vehicle 320 may calculate that driving to the teenager's home, performing the task, and returning to the father's workplace may take approximately 1.5 hours. Therefore, the autonomous vehicle 320 may determine that the requested task from the teenager does not conflict with the schedule 322. The autonomous vehicle 320 may determine an estimated period of time (e.g., 15 minutes) to drive to the teenager's home in order to pick up the teenager, and send the estimated period of time to the computing device 310. The autonomous vehicle 320 may perform the task, and then return to the father's workplace in order to perform the next task on the schedule 322.

Figure 3B:
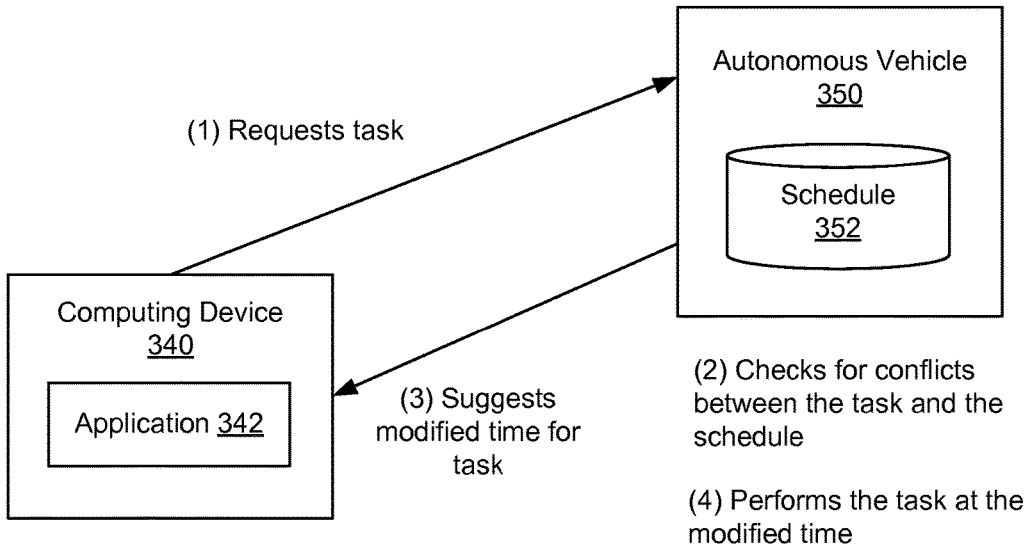
FIG. 3B illustrates a system and related operations for performing a task at an autonomous vehicle after receiving a task request from a mobile device according to an example of the present technology.

FIG. 3B illustrates an exemplary system and related operations for performing a task at an autonomous vehicle 350 after receiving a task request from a computing device 310. The autonomous vehicle 350 may be configured to perform a plurality of tasks in accordance with a schedule 352. The computing device 340 may send, via an application 342 executing on the computing device 340, the request for the task to be performed by the autonomous vehicle 350. The task defined in the request may be a recurring task or a one-time task. The request for the task may indicate a pickup location (or a starting location), a pickup time, a drop-off location (or an ending location) and/or a drop-off time.

The autonomous vehicle 350 may compare the task with the schedule 352 of tasks to be performed at the autonomous vehicle 350. The autonomous vehicle 350 may determine whether the task conflicts with previously scheduled tasks that are included on the schedule 352. In one example, the autonomous vehicle 350 may determine that the task conflicts with one or more previously scheduled tasks on the schedule 352. The previously scheduled tasks may be assigned a higher priority level as compared to the individual's task because the previous tasks were scheduled earlier in time as compared to the individual's task. Therefore, the autonomous vehicle 350 may not add the individual's task to the schedule 352.

In one configuration, the autonomous vehicle 350 may determine whether the task is performable at a time that is within a defined threshold of the requested time. For example, the autonomous vehicle 350 may determine whether the task is performable 30 minutes prior to the requested task time or 30 minutes after the requested task time. If the autonomous vehicle 350 is unable to perform the task at the requested time, but is able to perform the task at a time that is relatively close to the requested time, then the autonomous vehicle 350 may send a message to the computing device 340 with a modified suggested task time. In other words, the autonomous vehicle 350 may suggest an alternative time for performing the task that does not conflict with previously scheduled tasks on the schedule 352.

The individual may inform the autonomous vehicle 350, via the application 342 that is executing on the computing device 310, if the modified suggested task time is acceptable or not acceptable. If the modified suggested task time is not acceptable, then the individual's task may not be added to the schedule 352. If the modified suggested task time is acceptable, then the individual's task may be added to the schedule 352 and the autonomous vehicle 350 may perform the task in accordance with the modified suggested task time.

As a non-limiting example, a user may request, via the computing device 340, the autonomous vehicle 350 to perform a one-time task of driving the user to a movie theater. The user may request to be dropped off at the movie theater at 4:30 PM. The autonomous vehicle 350 may compare the one-time task to the schedule 352, and determine that the one-time task conflicts with a previously scheduled task. The autonomous vehicle 350 may calculate that dropping the user at the movie theater at 4:15 PM, as opposed to 4:30 PM, may enable both the one-time task and a subsequently scheduled task to be performed. The autonomous vehicle 350 may send a message to the computing device 340 suggesting that the one-time task be performed 15 minutes earlier. The computing device 340 may send a message acknowledging the modified task time, and the autonomous vehicle 350 may perform the one-time task in accordance with the modified task time.

In one example, when a new task (e.g., a one-time task) requested from the computing device 340 conflicts with a previous task that has already been scheduled, the autonomous vehicle 350 may send a message to the user associated with the previous task, wherein the message requests the user to reschedule the previous task in order to accommodate the new task. If the user agrees to reschedule the previous task, then the previous task may be rescheduled and the new task will be added to the schedule 352 in place of the previous task. A notification may be sent to both the user associated with the previous task and the user associated with the new task, wherein the notification confirms that the task is to be performed at a certain time. The autonomous vehicle 350 may reschedule the previous task to be performed either before the new task or after the new task. In one example, previously scheduled tasks may be rescheduled to accommodate newer tasks if approval is received from the user associated with the previously scheduled task.

The technology described herein may enable a selected group of individuals to optimally share an autonomous vehicle. For example, the autonomous vehicle may be shared by members of a family. The ability to conveniently share the autonomous vehicle among the group of individuals may avoid each individual in the group having to purchase a separate autonomous vehicle. Often times, an autonomous vehicle may be unused for long periods of the day, but the autonomous vehicle may be unusable to other individuals. For example, the autonomous vehicle may remain parked at an individual's workplace all day when the individual is at work, but the autonomous vehicle is unable to other individuals during this time. Therefore, the ability to share the autonomous vehicle among the group of individuals may optimize use of the autonomous vehicle.

Figure 4:
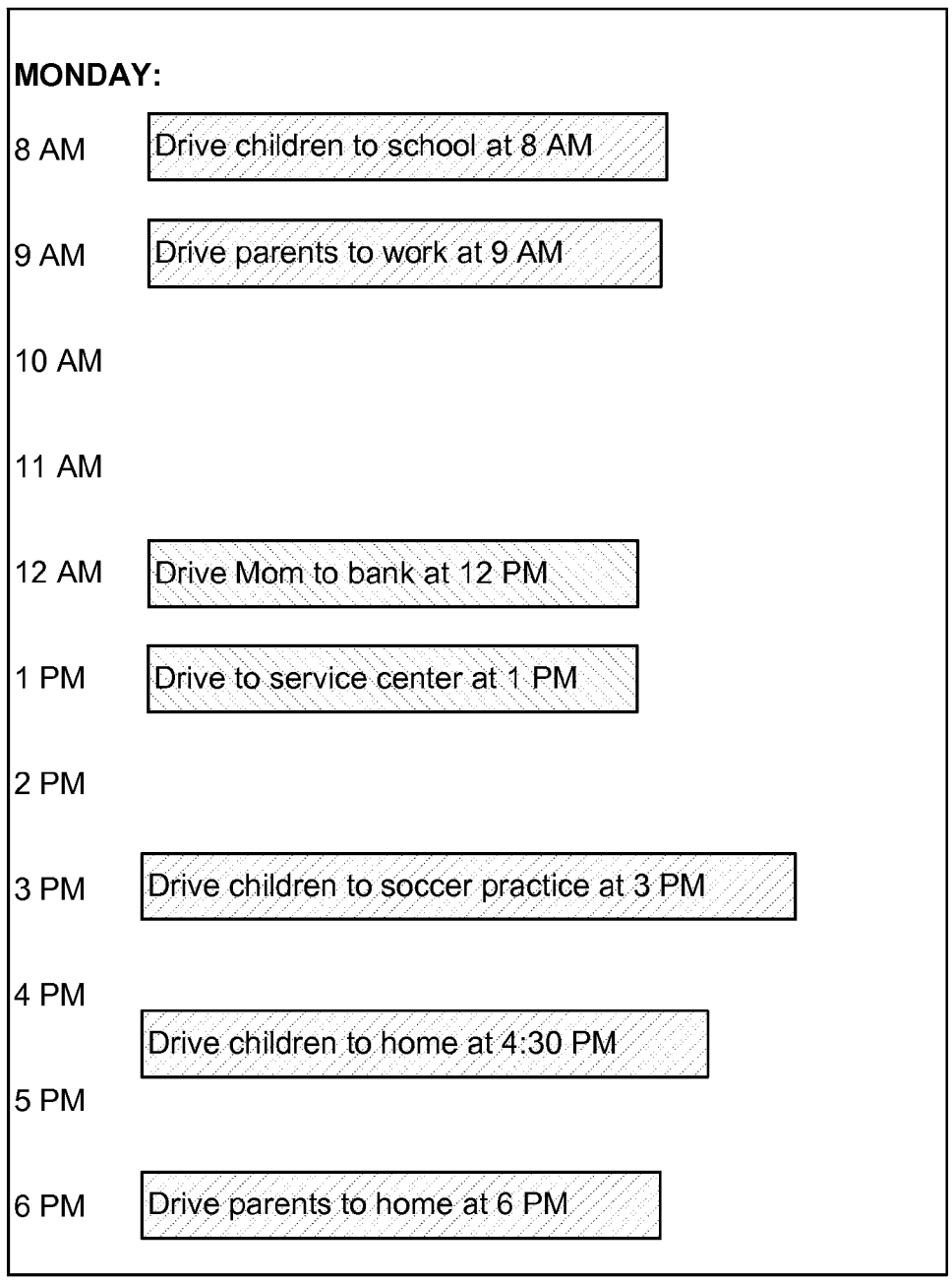
FIG. 4 illustrates a schedule of tasks to be performed by an autonomous vehicle according to an example of the present technology.

FIG. 4 illustrates an exemplary schedule 400 of tasks to be performed by an autonomous vehicle. The schedule 400 may include a list of tasks that the autonomous vehicle is to perform for a given day. The tasks included in the schedule 400 may include, but are not limited to, driving to a preselected location in order to pick up an individual, driving to a preselected location in order to drop off an individual, driving to a preselected location to enable a service (e.g., vehicle maintenance, vehicle refueling or recharging) to be performed on the autonomous vehicle, driving to a preselected location to enable an individual to perform a task, etc. In one example, performing a task may involve the autonomous vehicle performing several individual sub-tasks. As an example, a task may involve driving from an initial location to a pickup location to pick up an individual, driving to a drop-off location to drop off the individual, and then driving to a base location (e.g., a parking lot) before performing a subsequent task. For each task on the schedule 400, one or more processors of the autonomous vehicle may provide commands to drive the autonomous vehicle from a starting location to an ending location. The autonomous vehicle may determine an optimal route for traveling from the starting location to the ending location in order to perform each task on the schedule 400.

In one example, the tasks may be added to the schedule 400 by individuals that are authorized to create and/or modify the schedule 400. For example, computing devices that are previously authenticated to create and/or modify the schedule 400 may request for a task to be added to the schedule 400. The autonomous vehicle may determine whether the requested task conflicts with previously scheduled tasks on the schedule 400, and if there is no conflict, then the requested task can be added onto the schedule 400. In one example, the computing devices that are used to add tasks to the schedule 400 may be associated with a selected group of individuals (e.g., family members, friends, colleagues, neighbors).

In one example, the autonomous vehicle may receive the requested task and determine an estimated amount of time to perform the task. The estimated amount of time may be determined using a starting location of the task, an ending location of the task, a distance between the starting location and the ending location, traffic information for a route used to drive from the starting location to the ending location at a selected time, etc. Based on the estimated amount of time, the autonomous vehicle may determine whether the requested task conflicts with previously scheduled tasks on the schedule 400, and if there is no conflict, the requested task may be added onto the schedule 400. As a result, for the estimated amount of time associated with the task that is scheduled, the autonomous vehicle may be unable to perform other tasks for other individuals. The schedule 400 may dynamically change as additional task requests are received from the computing devices, or existing tasks are modified and/or canceled.

As shown in FIG. 4, the schedule 400 may include a list of tasks to be performed at the autonomous vehicle on a given day (e.g., Monday). The tasks on the schedule 400 may be recurring tasks that are performed in accordance with a defined periodicity. In addition, the tasks on the schedule 400 may be one-time tasks that are each performed a single time. As an example, the schedule 400 may indicate a recurring task of driving children from home to school at 8 AM. The schedule 400 may indicate a recurring task of driving parents from home to work at 9 AM. The schedule 400 may indicate a one-time task of driving Mom from work to the bank at 12 PM. The schedule 400 may indicate a one-time task of driving from a workplace to a service center at 1 PM to enable a service (e.g., tire rotation) to be performed on the autonomous vehicle. The schedule 400 may indicate a recurring task of driving from a starting location (e.g., a workplace) to school and then driving the children to soccer practice at 3 PM. The schedule 400 may indicate a recurring task of driving from a starting location (e.g., a parking area associated with a soccer field) at 4:30 PM to transport the children home. In addition, the schedule 400 may indicate a recurring task of driving from a starting location (e.g., home) to pick up the parents at the workplace at 6 PM, and then drive the parents back home. Therefore, the autonomous vehicle may perform a series of tasks on a given day in accordance with the schedule 400.

Figure 5:
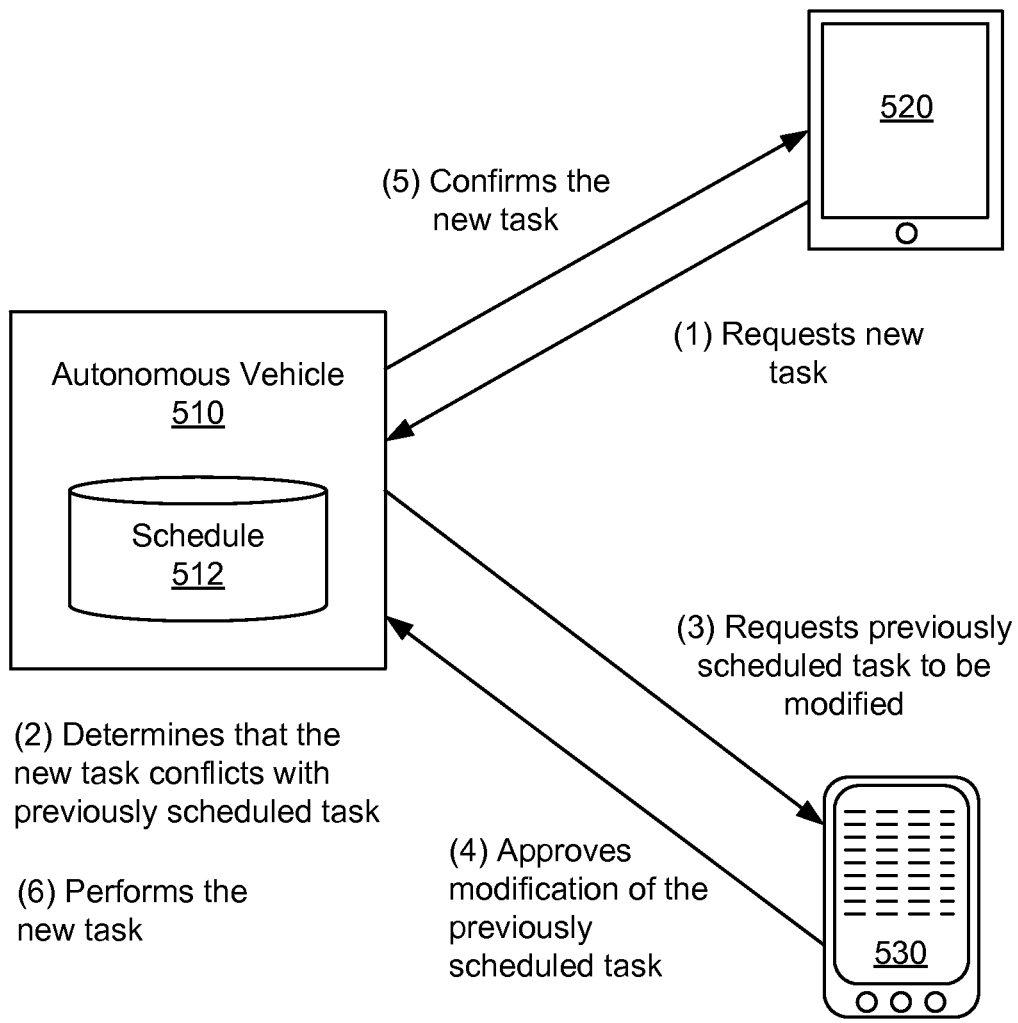
FIG. 5 illustrates a system and related operations for sharing an autonomous vehicle according to an example of the present technology.

FIG. 5 illustrates an exemplary system and related operations for sharing an autonomous vehicle 510. The autonomous vehicle 510 may be configured to perform a number of tasks in accordance with a schedule 512. The tasks may include driving to a preselected location in order to pick up an individual, driving to a preselected location in order to drop off an individual, etc. In one example, a first device 520 may request to add a new task onto the schedule 512 of tasks to be performed by the autonomous vehicle 510. The first device 520 may be authorized to create and/or modify the tasks on the schedule 512. The autonomous vehicle 510 may determine whether the new task conflicts with previously scheduled tasks on the schedule 512, and if there is no conflict, the autonomous vehicle 510 may add the new task to the schedule 512 of tasks to be performed by the autonomous vehicle 510. The previously scheduled task and the new task may be either a recurring task or a one-time task.

In one example, the autonomous vehicle 510 may determine that the new task conflicts with a previously scheduled task on the schedule 512. The previously scheduled task may be associated with a second device 530. In general, tasks that are scheduled earlier in time may be assigned a higher priority level than tasks that are scheduled later in time. However, an individual associated with the previously scheduled task may optionally modify the previous task to accommodate the new task. For example, the autonomous vehicle 510 may send a message to the second device 530 requesting that the previously scheduled task be modified to accommodate the new task. An individual associated with the second device 530 may agree to modify the previously scheduled task, or to adhere to an original time for the previously scheduled task and not accommodate the new task.

In one example, the second device 530 may send a message to the autonomous vehicle 510 that approves of the modification to the previously scheduled task. The autonomous vehicle 510 may add the new task to the schedule 512 at the requested time. The autonomous vehicle 510 may send a message to the first device 520 confirming the new task at the requested time. In addition, the autonomous vehicle 510 may modify the previously scheduled task on the schedule 512 to accommodate the new task. In one example, the previously scheduled task may be a recurring task, so the autonomous vehicle 510 may only modify the recurring task for a particular day to accommodate the new task (if the new task is a one-time task), but the scheduling for the recurring tasks on the other days may remain intact. The autonomous vehicle 510 may perform the previously scheduled task (as modified) and the new task in accordance with the schedule 512. In this example, previously scheduled tasks may be modified with user approval, even though the previously scheduled tasks generally have a higher priority over tasks that are scheduled later in time.

Figure 6:
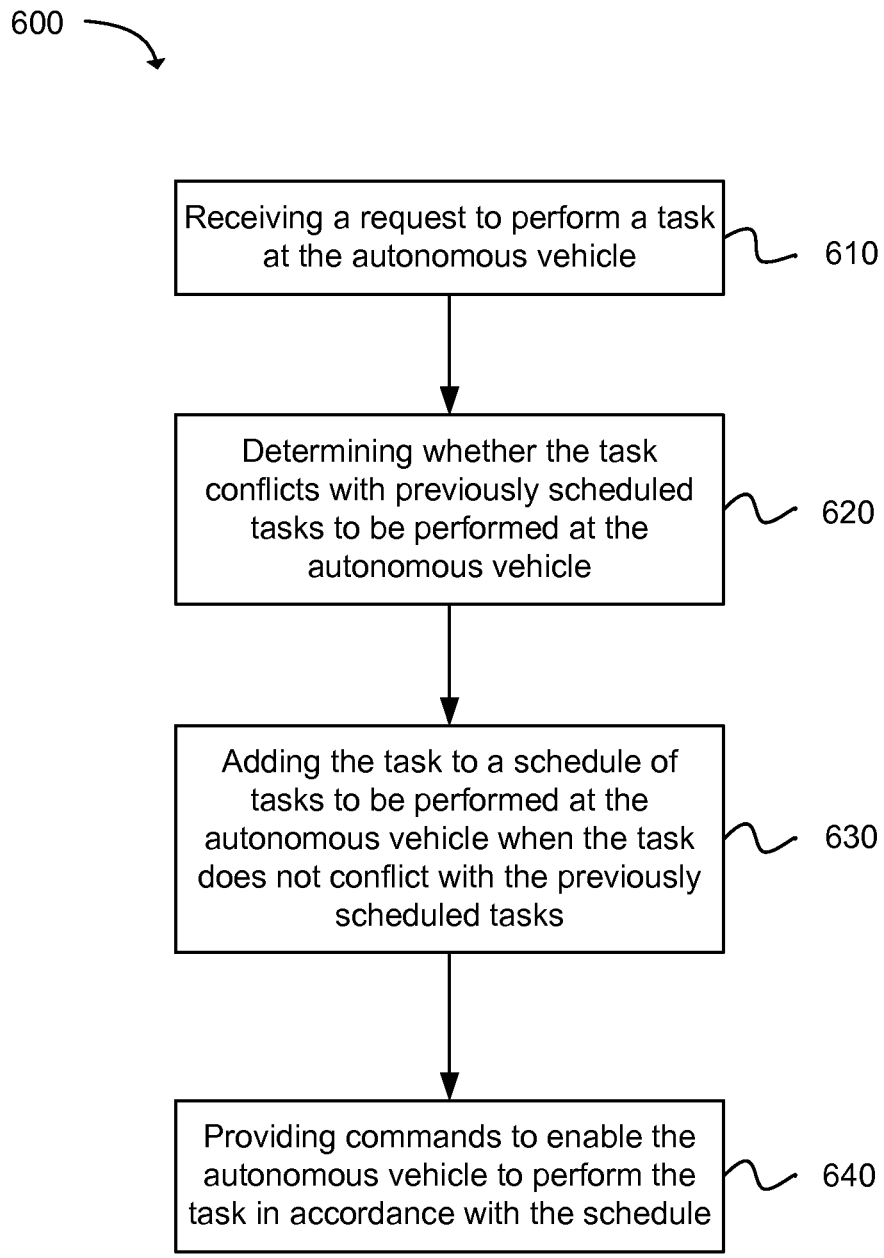
FIG. 6 is a flowchart of a method for sharing an autonomous vehicle according to an example of the present technology.

FIG. 6 illustrates an example of a method 600 for sharing an autonomous vehicle. The method may be executed as instructions on a machine, where the instructions are included on at least one computer readable medium or one non-transitory machine readable storage medium. The method may be executed by one or more processors on the machine. The method may include the operation of receiving a request to perform a task at the autonomous vehicle, as in block 610. The method may include the operation of determining whether the task conflicts with previously scheduled tasks to be performed at the autonomous vehicle, as in block 620. The method may include the operation of adding the task to a schedule of tasks to be performed at the autonomous vehicle when the task does not conflict with the previously scheduled tasks, as in block 630. The method may include the operation of providing commands to enable the autonomous vehicle to perform the task in accordance with the schedule, as in block 640.

In one example, the operation of providing the commands to enable the autonomous vehicle to perform the task further comprises: providing commands to drive the autonomous vehicle to a defined location at a selected time to pick up a user in accordance with the task; or providing commands to drive the autonomous vehicle to the defined location to drop off the user at the selected time in accordance with the task. In one example, the autonomous vehicle is shared between a selected group of users.

In one example, the task is added to the schedule of tasks to be performed at the autonomous vehicle for a user that is authorized to create or modify the schedule of tasks. In one example, the task performed by autonomous vehicle is a recurring task or a one-time task. In one example, the autonomous vehicle performs the recurring task at a predefined time and according to a predefined frequency.

In one example, the method further comprises the operations of: determining that the task conflicts with at least one of the previously scheduled tasks for the autonomous vehicle; and recommending an alternative time for the autonomous vehicle to perform the task. In one example, the method further comprises the operations of: determining that the task conflicts with a previously scheduled task on the schedule; and sending a message to a user associated with the previously scheduled task that conflicts with the task, the message requesting the user to modify a time associated with the previously scheduled task in order to accommodate a performance of the task. In one example, the method further comprises the operation of providing a notification to a mobile device when the autonomous vehicle is in proximity to a selected location associated with the task.

In one example, the method further comprises the operations of: determining that a selected time associated with the task is to be delayed, the selected time including a drop-off time or a pickup time; calculating an adjusted time based, in part, on traffic information for a route being used by the autonomous vehicle to perform the task; and notifying a mobile device of the adjusted time, the mobile device being associated with a user for which the task is to be performed; or providing the adjusted time for display on a display screen inside the autonomous vehicle. In one example, the method further comprises the operation of: determining to prioritize the task over a previously scheduled task that conflicts with the task, wherein the task that is prioritized is added to the schedule and the previously scheduled task is removed from the schedule. In one example, the method further comprises the operation of providing, at the autonomous vehicle, commands to drive the autonomous vehicle to a base location or park in an available space between tasks on the schedule.

Figure 7:
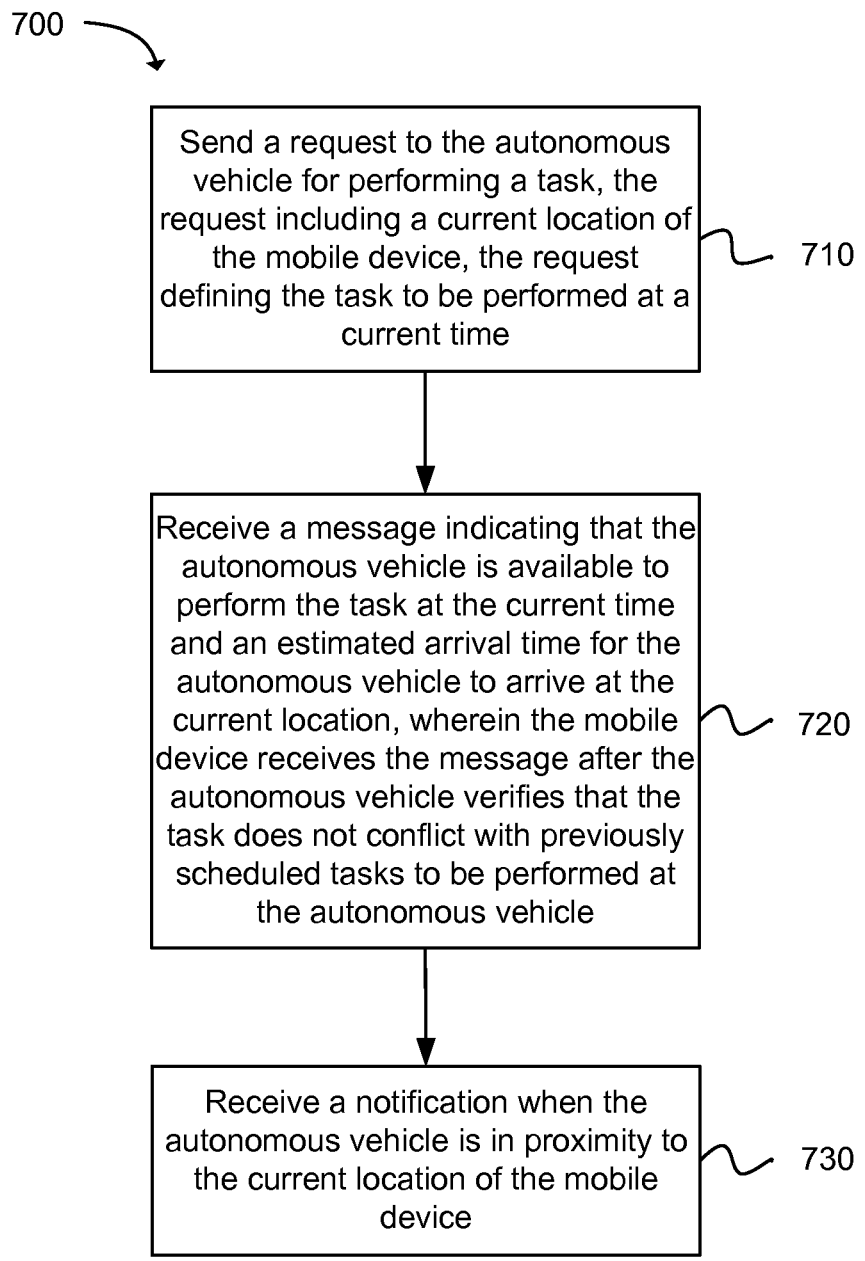
FIG. 7 depicts functionality of a mobile device operable to communicate with an autonomous vehicle according to an example of the present technology.

Another example provides functionality 700 of a mobile device operable to communicate with an autonomous vehicle, as shown in the flow chart in FIG. 7. The functionality can be implemented as a method or the functionality can be executed as instructions on a machine, where the instructions are included on at least one computer readable medium or one non-transitory machine readable storage medium. The method may be executed by one or more processors on the machine. The mobile device may be configured to send a request to the autonomous vehicle for performing a task, the request including a current location of the mobile device, the request defining the task to be performed at a current time, as in block 710. The mobile device may be configured to receive a message indicating that the autonomous vehicle is available to perform the task at the current time and an estimated arrival time for the autonomous vehicle to arrive at the current location, wherein the mobile device receives the message after the autonomous vehicle verifies that the task does not conflict with previously scheduled tasks to be performed at the autonomous vehicle, as in block 720. The mobile device may be configured to receive a notification when the autonomous vehicle is in proximity to the current location of the mobile device, as in block 730.

In one example, the task includes picking up a user at the current location and dropping the user off at a selected drop-off location. In one example, the mobile device is associated with a user in a selected group of users that are authorized to share the autonomous vehicle. In one example, the mobile device may be further configured to receive an additional notification with an updated estimated arrival time when the autonomous vehicle is delayed in route to the current location.

Figure 8:
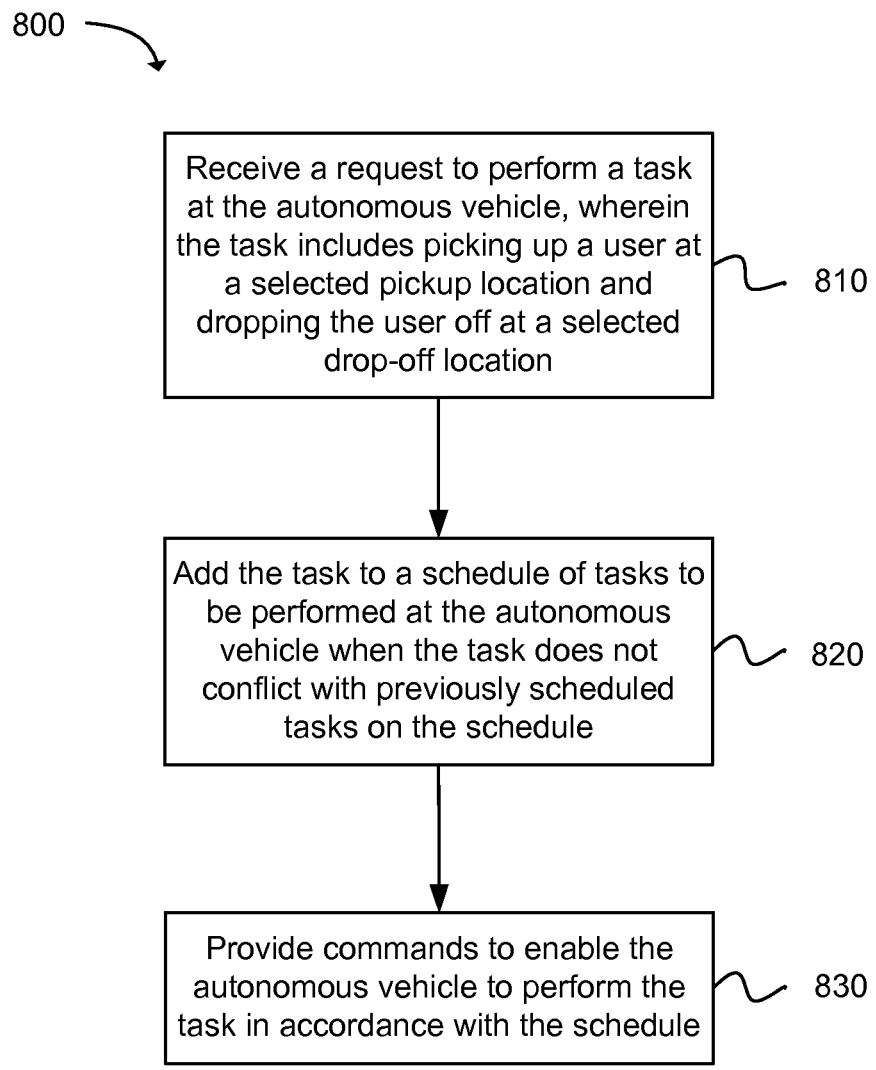
FIG. 8 depicts functionality of an autonomous vehicle according to an example of the present technology.

Another example provides functionality 800 of an autonomous vehicle, as shown in the flow chart in FIG. 8. The functionality can be implemented as a method or the functionality can be executed as instructions on a machine, where the instructions are included on at least one computer readable medium or one non-transitory machine readable storage medium. The method may be executed by one or more processors on the machine. The autonomous vehicle may be configured to receive a request to perform a task at the autonomous vehicle, wherein the task includes picking up a user at a selected pickup location and dropping the user off at a selected drop-off location, as in block 810. The autonomous vehicle may be configured to add the task to a schedule of tasks to be performed at the autonomous vehicle when the task does not conflict with previously scheduled tasks on the schedule, as in block 820. The autonomous vehicle may be configured to provide commands to enable the autonomous vehicle to perform the task in accordance with the schedule, as in block 830.

In one example, the autonomous vehicle may receive the request to perform the task from a user who is included in a selected group of users that share the autonomous vehicle, wherein the task is a recurring task or a one-time task. In one example, the autonomous vehicle may determine that the task conflicts with a previously scheduled task on the schedule; and recommend an alternative time for performing the task. In one example, the autonomous vehicle may provide commands to drive the autonomous vehicle to a default location between tasks that are to be performed according to the schedule.

Figure 9:
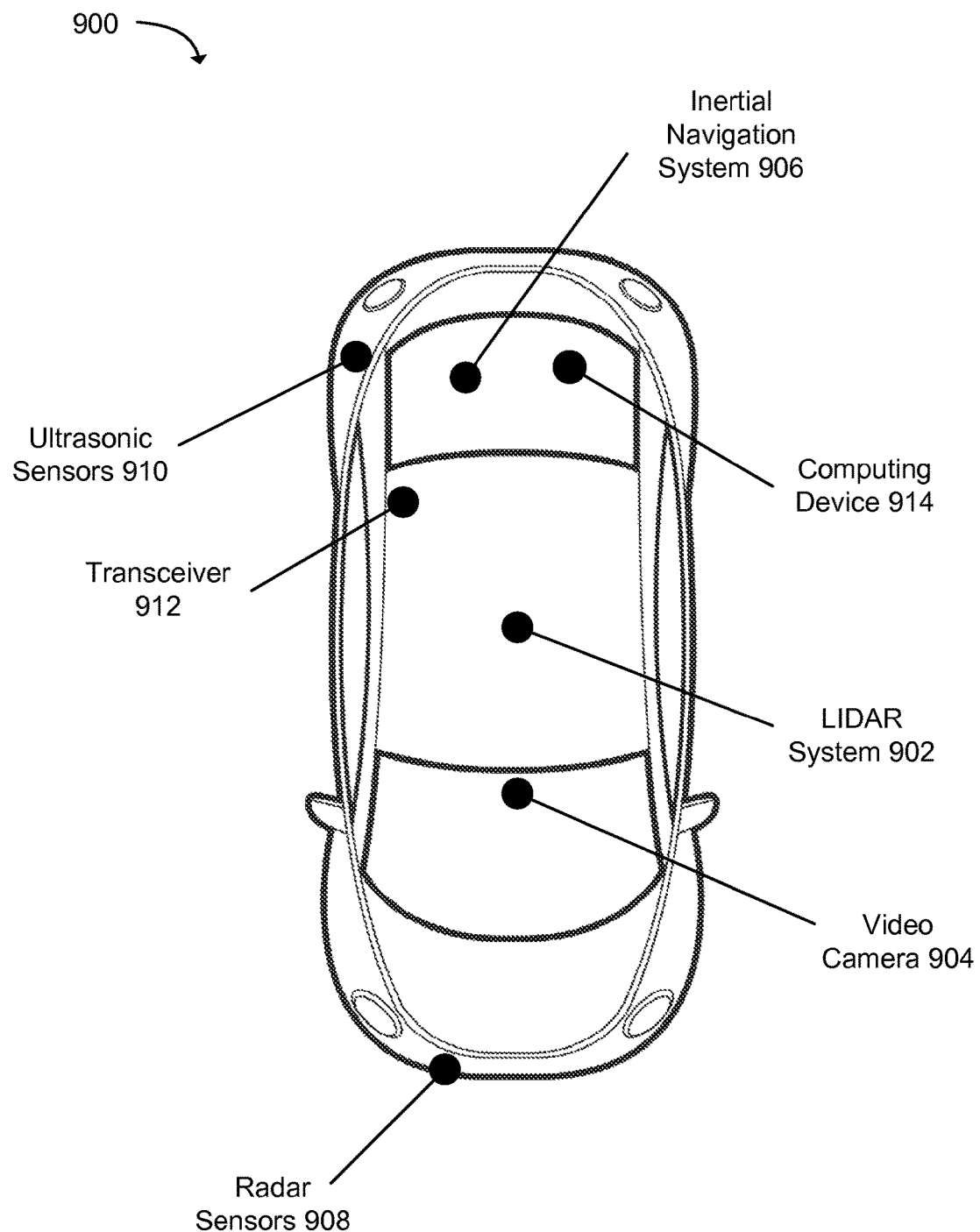
FIG. 9 illustrates an autonomous vehicle according to an example of the present technology.

FIG. 9 illustrates an example of an autonomous vehicle 900 that is capable of sensing a surrounding environment and navigating itself to a destination. The autonomous vehicle 900 may be classified as a "Level 0" autonomous vehicle, a "Level 1" autonomous vehicle, a "Level 2" autonomous vehicle, a "Level 3" autonomous vehicle, or a "Level 4" autonomous vehicle. In Level 0, a driver may control the autonomous vehicle 900 at substantially all times. The driver may be in complete and sole control of primary vehicle controls, such as brake, steering, throttle and motive power. In Level 1, one or more individual controls may be automated in the autonomous vehicle 900, such as electronic stability control or automatic braking, in which the vehicle may automatically assist with braking to enable the driver to regain control of the vehicle or stop faster than possible by acting alone. In Level 2, at least two controls may be automated in unison in the autonomous vehicle 900, such as adaptive cruise control in combination with lane keeping. In Level 3, the driver may cede full control of substantially all safety-critical functions to the autonomous vehicle 900 under certain traffic or environmental conditions. The autonomous vehicle 900 may sense when certain conditions necessitate the driver to retake control of the autonomous vehicle 900 and a sufficiently comfortable transition time may be provided for the driver to retake control of the autonomous vehicle 900. In Level 4, the autonomous vehicle 900 may perform substantially all safety-critical driving functions and monitor roadway conditions for an entire trip. The driver may provide destination or navigation input, but the driver may not be expected to control the autonomous vehicle 900 at any time during the trip. As the autonomous vehicle 900 may control all functions from start to stop, including parking functions, in level 4, the autonomous vehicle 900 may include both occupied and unoccupied vehicles. In one example, the autonomous vehicle 900 may be restricted to operating in certain environments or under certain conditions based on government regulations.

The autonomous vehicle 900 may include, but is not limited to, cars, trucks, motorcycles, buses, recreational vehicles, golf carts, trains, and trolleys. The autonomous vehicle 900 may include an internal combustion engine that operates using liquid fuels (e.g., diesel, gasoline). Alternatively, the autonomous vehicle 900 may include one or more electric motors that operate using electrical energy stored in batteries. The autonomous vehicle 900 may include, but is not limited to, a light detection and ranging (LIDAR) system 902, a video camera 904, an inertial navigation system 906, radar sensors 908, ultrasonic sensors 910, a transceiver 912, and a computing device 914 that, while working together in combination, enable the autonomous vehicle 900 to sense the environment and navigate to the destination with reduced user input. The autonomous vehicle 900 may use information captured by the various sensors, cameras, etc. to safely drive the autonomous vehicle 900 along a route to a destination, while avoiding obstacles and obeying traffic laws. The autonomous vehicle 900 may perform a series of steps when following the route to the destination. For example, the autonomous vehicle 900 may drive 500 meters, turn right, drive 1000 meters, turn left, etc. in order to reach the destination.

The LIDAR system 902 (also known as a laser range finder) may be mounted onto a surface (e.g., a top surface) of the autonomous vehicle 900. The LIDAR system 902 may emit a plurality of light pulses and measure an amount of time for the light pulses to return to the autonomous vehicle 900, thereby allowing the LIDAR system 902 to measure the distance of objects surrounding the autonomous vehicle 900. As a non-limiting example, the LIDAR system 902 may measure the distance of objects within 200 meters from the autonomous vehicle 900.

One or more video cameras 904 may be mounted to a front, rear or side portion of the autonomous vehicle 900. The autonomous vehicle 900 may use the LIDAR system 902 and the video camera 904 to build a three-dimensional (3D) map of the autonomous vehicle's surroundings. The 3D map may capture a 360-degree view around the autonomous vehicle 900. In one example, the 3D map may capture the autonomous vehicle's surroundings within 200 meters. The 3D map may include a variety of features, such as road edges, road signs, lane markings, guardrails, overpasses, etc. The 3D map may indicate stationary objects, such as buildings, telephone poles, mailboxes, etc. In addition, the 3D map may indicate moving objects, such as other vehicles, bicyclists, pedestrians, etc.

In one example, the 3D map generated using the LIDAR system 902 and the video camera 904 may be correlated with high-resolution maps of the world. The high-resolution maps may indicate lane markings, terrain, elevation, speed limits, and other features related to the route taken by the autonomous vehicle 900 when driving to the destination. In addition, the autonomous vehicle 900 may position or localize itself within the 3D map. In other words, the autonomous vehicle 900 may determine its position in relation to the objects included in the 3D map. The autonomous vehicle 900 may determine its position by using the inertial navigation system 906. The inertial navigation system 906 may calculate a position, orientation, and velocity (i.e., direction and speed of movement) of the autonomous vehicle 900.

The inertial navigation system 906 may include a combination of gyroscopes, altimeters, tachometers, gyroscopes and other motion-sensing devices in order to calculate the autonomous vehicle's position. The inertial navigation system 906 may determine an initial position and velocity, and thereafter compute the autonomous vehicle's updated position and velocity by integrating information received from the motion-sensing devices. In one example, a GPS receiver (not shown in FIG. 9) may provide the initial position of the autonomous vehicle 900 (e.g., latitude, longitude, altitude). Thereafter, the autonomous vehicle 900 may use the inertial navigation system 906 to determine its position in relation to the objects on the 3D map. As the autonomous vehicle 900 drives to the destination, updated positional information from the inertial navigation system 906 may continually update the 3D map of the autonomous vehicle's surroundings.

The radar sensors 908 may be mounted on front, rear and/or side sections of the autonomous vehicle 900. The radar sensors 908 may monitor a position of proximately-located vehicles on the road, such as vehicles immediately behind or in front of the autonomous vehicle 900. In addition, ultrasonic sensors 910 may be used to measure a distance to proximately-located objects, such as curbs or other vehicles when the autonomous vehicle 900 is parking. The radar sensors 908 and the ultrasonic sensors 910 may be used when generating and updating the 3D map of the autonomous vehicle's surroundings. For example, the radar sensors 908 and the ultrasonic sensors 910 may detect objects that are located in proximity to the autonomous vehicle 900 and those objects may be included in the 3D map of the autonomous vehicle's surroundings.

The transceiver 912 may allow the autonomous vehicle 900 to communicate with other devices or systems when driving to the destination. For example, the transceiver 912 may communicate with other vehicles on the road using vehicle-to-vehicle (V2V) communication. V2V communication may use dedicated short-range communications (DSRC) and operate in the 5.9 GHz frequency range. The range for V2V communication may be approximately 300 meters. In addition, the transceiver 912 may communicate with computing devices (e.g., mobile phones, tablet computers) that provide instructions to the autonomous vehicle 900 via wireless communication standards, such as Third Generation Partnership Project (3GPP) Long Term Evolution (LTE), Wi-Fi, WiMAX, Bluetooth, etc. The above list of wireless communication standards is non-limiting and is intended to include related wireless communication standards that are forthcoming. In one example, the transceiver 912 may enable the autonomous vehicle 900 to receive messages from the computing devices, such as messages requesting a pickup, messages instructing the autonomous vehicle 900 to perform a particular task, etc.

The computing device 914 may receive information collected and/or generated from the LIDAR system 902, the video cameras 904, the inertial navigation system 906, the radar sensors 908, the ultrasonic sensors 910, and the transceiver 912. The computing device 914 may process the information (e.g., the 3D map of the vehicle's surroundings) in real-time and determine whether to modify the autonomous vehicle's current velocity and orientation in response to the sensed environment. The computing device 914 may use the received information in order to provide commands to the autonomous vehicle's actuators, thereby controlling steering, acceleration, braking and throttle of the autonomous vehicle 900. The computing device 914 may perform the tasks of localization, 3D mapping, obstacle avoidance, path planning, etc. multiple times per second until the autonomous vehicle 900 reaches the destination. In addition, the computing device 914 may include a data store that stores various types of information, such as road speed limits, traffic accidents, road construction work, etc. The computing device 914 may receive the information from a server via the transceiver 912. The computing device 914 may use the various types of information received from the server for making intelligent decisions when guiding the autonomous vehicle 900 to the destination, In one example, the computing device 914 or a portion of the computing device 914 may be in idle mode (e.g., a low power mode or a standby mode) when the autonomous vehicle 900 is shut off. For example, the computing device 914 may be in idle mode when the autonomous vehicle 900 is parked in a parking space. The computing device 914 may periodically check for messages that are received when the computing device 914 is in idle mode. For example, the computing device 914 may periodically check for messages received from a mobile device. The computing device 914 may transition from idle mode into an on mode upon receiving a message that instructs the autonomous vehicle 900 to perform a task (e.g., drive to a destination). In one configuration, the computing device 914 or the portion of the computing device 914 may be powered via energy harvesting when in idle mode. For example, the computing device 914 may derive energy from external sources in order to receive messages from the device. The external sources may include, but is not limited to, solar power, battery power, thermal power, wind energy, and kinetic energy.

Figure 10:
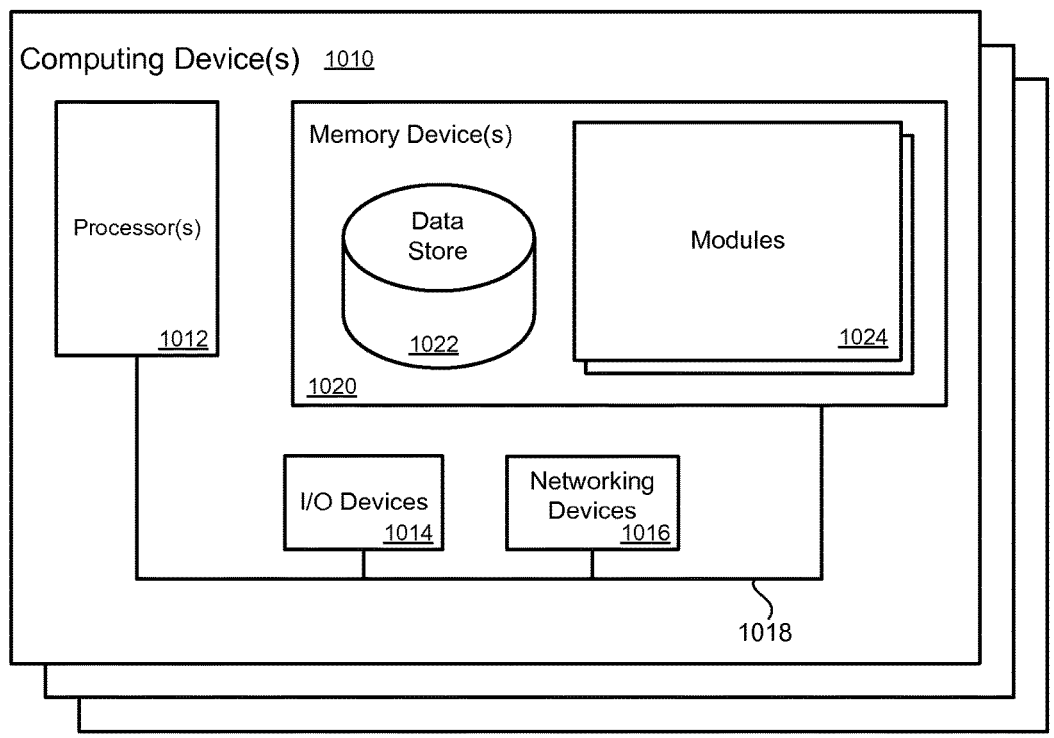
FIG. 10 is a block diagram that provides an example illustration of a computing device that may be employed in the present technology.

FIG. 10 illustrates a computing device 1010 on which modules of this technology may execute. A computing device 1010 is illustrated on which a high level example of the technology may be executed. The computing device 1010 may include one or more processors 1012 that are in communication with memory devices 1020. The computing device may include a local communication interface 1018 for the components in the computing device. For example, the local communication interface may be a local data bus and/or any related address or control busses as may be desired.

The memory device 1020 may contain modules 1024 that are executable by the processor(s) 1012 and data for the modules 1024. The modules 1024 may execute the functions described earlier. A data store 1022 may also be located in the memory device 1020 for storing data related to the modules 1024 and other applications along with an operating system that is executable by the processor(s) 1012.

Other applications may also be stored in the memory device 1020 and may be executable by the processor(s) 1012. Components or modules discussed in this description that may be implemented in the form of software using high programming level languages that are compiled, interpreted or executed using a hybrid of the methods.

The computing device may also have access to I/O (input/output) devices 1014 that are usable by the computing devices. An example of an I/O device is a display screen that is available to display output from the computing devices. Other known I/O device may be used with the computing device as desired. Networking devices 1016 and similar communication devices may be included in the computing device. The networking devices 1016 may be wired or wireless networking devices that connect to the internet, a LAN, WAN, or other computing network.

The components or modules that are shown as being stored in the memory device 1020 may be executed by the processor 1012. The term "executable" may mean a program file that is in a form that may be executed by a processor 1012. For example, a program in a higher level language may be compiled into machine code in a format that may be loaded into a random access portion of the memory device 1020 and executed by the processor 1012, or source code may be loaded by another executable program and interpreted to generate instructions in a random access portion of the memory to be executed by a processor. The executable program may be stored in any portion or component of the memory device 1020. For example, the memory device 1020 may be random access memory (RAM), read only memory (ROM), flash memory, a solid state drive, memory card, a hard drive, optical disk, floppy disk, magnetic tape, or any other memory components.

The processor 1012 may represent multiple processors and the memory 1020 may represent multiple memory units that operate in parallel to the processing circuits. This may provide parallel processing channels for the processes and data in the system. The local interface 1018 may be used as a network to facilitate communication between any of the multiple processors and multiple memories. The local interface 1018 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

As used herein, the term "processor" can include general purpose processors, specialized processors such as VLSI, FPGAs, and other types of specialized processors, as well as base band processors used in transceivers to send, receive, and process wireless communications.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. An autonomous vehicle, comprising:
   a processor;
   a memory device including a data store to store a plurality of data and instructions that, when executed by the processor, cause the processor to:
   receive, at the autonomous vehicle from a mobile device, a request to perform a task at the autonomous vehicle, wherein the task includes picking up a user at a selected pickup location and dropping the user off at a selected drop-off location;
   determine, at the autonomous vehicle, whether the task conflicts with previously scheduled tasks to be performed at the autonomous vehicle;
   add the task to a schedule of tasks to be autonomously performed at the autonomous vehicle when the task does not conflict with the previously scheduled tasks on the schedule;
   send a message to a user associated with a previously scheduled task when the task conflicts with the previously scheduled task on the schedule, the message requesting the user to modify a time associated with the previously scheduled task in order to accommodate a performance of the task; and
   provide commands to enable the autonomous vehicle to perform the task in accordance with the schedule.

2. The autonomous vehicle of claim 1, wherein the plurality of data and instructions, when executed by the processor, cause the processor to: receive the request to perform the task from the mobile device associated with a user that is included in a predefined group of users that share usage of the autonomous vehicle.

3. The autonomous vehicle of claim 1, wherein the plurality of data and instructions, when executed by the processor, cause the processor to:
   determine that the task conflicts with a previously scheduled task on the schedule; and
   recommend an alternative time for performing the task.

4. The autonomous vehicle of claim 1, wherein the plurality of data and instructions, when executed by the processor, cause the processor to: provide commands to drive the autonomous vehicle to a default location between tasks that are to be performed according to the schedule.

5. The autonomous vehicle of claim 1, wherein the plurality of data and instructions, when executed by the processor, cause the processor to:
   provide commands to drive the autonomous vehicle to a defined location at a selected time to pick up a user in accordance with the task; or
   provide commands to drive the autonomous vehicle to the defined location to drop off the user at the selected time in accordance with the task.

6. The autonomous vehicle of claim 1, wherein the plurality of data and instructions, when executed by the processor, cause the processor to: add the task to the schedule of tasks to be performed at the autonomous vehicle for a user that is authorized to create or modify the schedule of tasks.

7. The autonomous vehicle of claim 1, wherein the task performed by the autonomous vehicle is a recurring task or a one-time task.

8. The autonomous vehicle of claim 7, wherein the plurality of data and instructions, when executed by the processor, cause the processor to: provide commands to enable the autonomous vehicle to perform the recurring task at a predefined time and according to a predefined frequency.

9. The autonomous vehicle of claim 1, wherein the plurality of data and instructions, when executed by the processor, cause the processor to: provide a notification to the mobile device when the autonomous vehicle is within a defined distance from a selected location associated with the task.

10. The autonomous vehicle of claim 1, wherein the plurality of data and instructions, when executed by the processor, cause the processor to:
    determine that a selected time associated with the task is to be delayed, the selected time including a drop-off time or a pickup time;
    calculate an adjusted time based, in part, on traffic information for a route being used by the autonomous vehicle to perform the task; and
    notify the mobile device of the adjusted time, the mobile device being associated with a user for which the task is to be performed; or
    provide the adjusted time for display on a display screen inside the autonomous vehicle.

11. The autonomous vehicle of claim 1, wherein the plurality of data and instructions, when executed by the processor, cause the processor to: determine to prioritize the task over a previously scheduled task that conflicts with the task, wherein the task that is prioritized is added to the schedule and the previously scheduled task is removed from the schedule.

12. The autonomous vehicle of claim 1, wherein the plurality of data and instructions, when executed by the processor, cause the processor to:
    receive the request to perform the task from the mobile device, wherein the request includes a current location of the mobile device, and the request defines the task to be performed at a current time;
    verify that the task does not conflict with the previously scheduled tasks to be performed at the autonomous vehicle in accordance with the schedule;
    send, to the mobile device, a message indicating that the autonomous vehicle is available to perform the task at the current time and an estimated arrival time for the autonomous vehicle to arrive at the current location;

send a notification to the mobile device when the autonomous vehicle is within a defined distance from the current location of the mobile device.

13. The autonomous vehicle of claim 1, wherein the task includes picking up a user at the current location and dropping the user off at a selected drop-off location.

14. The autonomous vehicle of claim 1, wherein the plurality of data and instructions, when executed by the processor, cause the processor to: provide commands to park the autonomous vehicle in an available space between tasks on the schedule.

15. A non-transitory machine readable storage medium having instructions embodied thereon, the instructions when executed by one or more processors, cause the one or more processors to perform a process including:
receiving, at an autonomous vehicle from a mobile device, a request to perform a task at the autonomous vehicle, wherein the task includes picking up a user at a selected pickup location and dropping the user off at a selected drop-off location;
determining, at the autonomous vehicle, whether the task conflicts with previously scheduled tasks to be performed at the autonomous vehicle;
adding the task to a schedule of tasks to be autonomously performed at the autonomous vehicle when the task does not conflict with the previously scheduled tasks on the schedule;
sending a message to a user associated with a previously scheduled task when the task conflicts with the previously scheduled task on the schedule, the message requesting the user to modify a time associated with the previously scheduled task in order to accommodate a performance of the task; and
providing commands to enable the autonomous vehicle to perform the task in accordance with the schedule.

16. The non-transitory machine readable storage medium of claim 15, the process further comprising:
receiving the request to perform the task from the mobile device associated with a user that is included in a predefined group of users that share usage of the autonomous vehicle; or
providing commands to drive the autonomous vehicle to a default location between tasks that are to be performed according to the schedule; or
providing commands to park the autonomous vehicle in an available space between tasks on the schedule; or
providing a notification to the mobile device when the autonomous vehicle is within a defined distance from a selected location associated with the task; or
recommending an alternative time for performing the task when the task conflicts with the previously scheduled task on the schedule.

17. The non-transitory machine readable storage medium of claim 15, the process further comprising:
providing commands to drive the autonomous vehicle to a defined location at a selected time to pick up a user in accordance with the task; or
providing commands to drive the autonomous vehicle to the defined location to drop off the user at the selected time in accordance with the task,
wherein the task includes picking up a user at the current location and dropping the user off at a selected drop-off location,
wherein the task performed by the autonomous vehicle is a recurring task or a one-time task.

18. The non-transitory machine readable storage medium of claim 15, the process further comprising:
adding the task to the schedule of tasks to be performed at the autonomous vehicle for a user that is authorized to create or modify the schedule of tasks; or
providing commands to enable the autonomous vehicle to perform the recurring task at a predefined time and according to a predefined frequency; or
determining to prioritize the task over a previously scheduled task that conflicts with the task, wherein the task that is prioritized is added to the schedule and the previously scheduled task is removed from the schedule.

19. The non-transitory machine readable storage medium of claim 15, the process further comprising:
determining that a selected time associated with the task is to be delayed, the selected time including a drop-off time or a pickup time;
calculating an adjusted time based, in part, on traffic information for a route being used by the autonomous vehicle to perform the task; and
notifying the mobile device of the adjusted time, the mobile device being associated with a user for which the task is to be performed; or
providing the adjusted time for display on a display screen inside the autonomous vehicle.

20. The non-transitory machine readable storage medium of claim 15, the process further comprising:
receiving the request to perform the task from the mobile device, wherein the request includes a current location of the mobile device, and the request defines the task to be performed at a current time;
verifying that the task does not conflict with the previously scheduled tasks to be performed at the autonomous vehicle in accordance with the schedule;
sending, to the mobile device, a message indicating that the autonomous vehicle is available to perform the task at the current time and an estimated arrival time for the autonomous vehicle to arrive at the current location;
sending a notification to the mobile device when the autonomous vehicle is within a defined distance from the current location of the mobile device.

* * * * *